United States Patent [19]
Krawczyk et al.

[11] Patent Number: 5,337,189
[45] Date of Patent: Aug. 9, 1994

[54] SCANNIG EMITTER-RECEIVER OPTICAL DEVICE

[75] Inventors: Rodolphe Krawczyk, Antibes; Guy Cerutti-Maori, Cannes-La-Bocca; Luc Boulissiere, Mandelieu, all of France

[73] Assignee: Aerospatiale Societe Nationale Industrielle, Paris, France

[21] Appl. No.: 63,078

[22] Filed: May 11, 1993

[30] Foreign Application Priority Data

May 13, 1992 [FR] France ................... 92 05815

[51] Int. Cl.$^5$ ............................................. G01C 3/08
[52] U.S. Cl. ...................................... 359/850; 356/5; 356/28.5
[58] Field of Search ............... 359/399, 196, 202; 356/5, 28.5, 141, 152; 235/470

[56] References Cited

U.S. PATENT DOCUMENTS

| | | | |
|---|---|---|---|
| 3,961,179 | 6/1976 | Kuffer | 250/203.2 |
| 3,984,685 | 10/1976 | Fletcher et al. | 250/339 |
| 4,154,529 | 5/1979 | Dyott | 356/28.5 |
| 4,290,670 | 9/1981 | Gerber | 356/5 X |
| 4,684,796 | 8/1987 | Johnson | 356/5 X |
| 5,185,676 | 2/1993 | Nishiberi | 356/152 X |
| 5,200,606 | 4/1993 | Krasutsky et al. | 356/5 X |
| 5,255,065 | 10/1993 | Schwemner | 356/5 X |

OTHER PUBLICATIONS

Leos' 89 Proceedings; Oct. 17, 1989, pp. 335-336.

*Primary Examiner*—Eugene R. LaRoche
*Assistant Examiner*—Christopher R. Gembocki
*Attorney, Agent, or Firm*—Remy J. VanOphem

[57] ABSTRACT

A scanning optical device for emitting and receiving which embodies an optical source adapted to emit a primary beam along an emission axis, a deflecting mirror arranged on an emission axis so as to intercept and deflect the primary beam, a telescope having an optical axis and a detector on this axis, and a scanning mirror mounted so as to rotate around a scan axis coaxial with the optical axis of the telescope and exhibiting a non-zero inclination with respect to the optical axis, wherein the optical source is positioned opposite to the telescope with respect to the scanning mirror, the emission axis being coaxial with the telescope optical axis, the deflecting mirror being fixed to the scanning mirror, and arranged at 90° with respect to the scanning mirror within a central opening provided in the scanning mirror.

6 Claims, 2 Drawing Sheets

SCANNIG EMITTER-RECEIVER OPTICAL DEVICE

BACKGROUND OF THE INVENTION

This invention deals with a scanning device for emitting a laser beam and receiving a return laser beam, for example in an optical instrument called a "lidar" (acronym for "Light Detection and Ranging") which is, as is known, the equivalent of a radar in the optical wavelength range (typically between 0.1 and 15 μm, or more).

In particular, lidars can be used, whether in space applications or not, for measuring atmospheric parameters or distances. In more general terms, lidars enable extended fluid masses to be characterized by compiling the results of selected parameter measurements carried out within multiple zones of these masses by a scanning device.

Such a known lidar 1 is represented in FIGS. 1 to 3. It embodies a laser source 2 with an emission axis X×X;

a telescope 3 with an optical axis Y—Y coplanar with the axis X—X, represented here as a block having a concave reflecting surface 4, the axis of which is coaxial with the optical axis Y—Y and at the focal point of which a detector 5 of any known appropriate type is fixed by means of a supporting structure generally shown by 5a;

a deflecting mirror 6 located at the intersection of the X—X and Y—Y axes and oriented perpendicular to their bisector so as to deflect a laser beam emitted by the laser source 2 along the X—X axis directly away from telescope 3; and a scanning mirror 7 mounted so as to pivot under the action of a motor shown schematically by 8, around a rotation axis coaxial with the telescope axis, intercepting the Y—Y axis opposite the telescope with respect to the deflecting mirror, in such a way as to intercept the laser beam emitted by the laser source 2 and deflected by the mirror.

In practice the emission axis of the laser source 2 is arranged at 90° with respect to the optical axis of the telescope and the scanning mirror is arranged at 45° with respect to this axis in order to be able, during its rotational movement (continuous or oscillatory), to send the laser beam in a plane transverse to the optical axis (this is then referred to as transverse scanning) and to be able to receive a return beam in the same plane so as to deviate it towards the reflecting surface of the telescope.

It will be appreciated that only the scanning mirror can move, the other elements being fixed with respect to a supporting structure, for example a spacecraft platform (not represented) orbiting around a planet such as the Earth.

FIG. 1 shows the emission of a laser pulse whereas FIG. 2 corresponds to the reception of a return beam, deflected for example by the Earth's atmosphere.

Compensation for the delay angle caused by the rotation of the scanning mirror between the time when the laser pulse is deflected away from the instrument by the scanning mirror and the time when a return pulse enters into the instrument so as to be deflected by the scanning mirror towards the telescope, is not taken into account in the sketches shown in FIGS. 1 to 3. This compensation is achieved for example by means of an appropriate pre-inclination of the laser source emission axis relative to the orientation it should be given if the scanning mirror were to remain fixed during the interval between emission and reception. Not being in itself part of the invention, this aspect will not be described in further detail here.

It can be appreciated that in order for the laser beam (specifically, this is in practice a succession of laser pulses) to describe a conical or even (as in the previously described case of transverse scanning) plane surface, the beam emitted by the source must intercept the scanning mirror at its center. However it may be observed in FIG. 3 that when the emitted beam is reflected by the central portion of the scanning mirror, stray light problems occur, which cause this central portion to scatter parasitic rays in all directions, and in particular towards the reflecting surface of the telescope and then towards the detector 5.

This parasitic flux is difficult to asses (it depends in particular on the diffusion coefficients of the mirror and protective elements—always imperfect—intended to shield the telescope from parasitic light); nonetheless it may be sufficiently significant to saturate the telescope detector since it is normally designed in accordance with the expected return flux, several orders of magnitude lower than the emitted light flux.

The purpose of the invention is to obviate the above-mentioned drawbacks by means of an arrangement of the scanning emission-reception instrument which, without degrading the scanning quality, minimizes the parasitic light flux likely to reach the detector.

An object of this invention is therefore to provide a scanning emitter-receiver optical device which embodies an optical source adapted to emit a primary beam along an emission axis, a deflecting mirror arranged on the emission axis so as to intercept and deflect the primary beam, a telescope having an optical axis and a detector on this axis, and a scanning mirror mounted so as to rotate around a scan axis coaxial with the optical axis of the telescope and having a non-zero inclination with respect to the optical axis. The optical source is positioned opposite to the telescope with respect to the scanning mirror, the emission axis being coaxial with the telescope optical axis, the deflecting mirror being fixed to the scanning mirror and arranged at 90° within a central opening provided in the scanning mirror.

According to preferred and possibly combined features of the invention the scanning mirror and the deflection mirror exhibit, with respect to the telescope optical axis, inclinations substantially equal to 45°;

the optical source is a laser source;

the scanning mirror embodies a hollow tube, traversed by the emission axis, which cooperates with bearings and a drive motor;

the drive motor cooperates with the hollow tube by means of a rack and pinion assembly; and the scanning mirror and the deflecting mirror are rotatively driven by a hollow motor.

Other objects, features and advantages of this invention will become apparent from the following detailed description of non-limiting examples thereof, taken in conjunction with the accompanying drawings.

DETAILED DESCRIPTION OF THE PREFERRED EMBODIMENT

Figure 1:
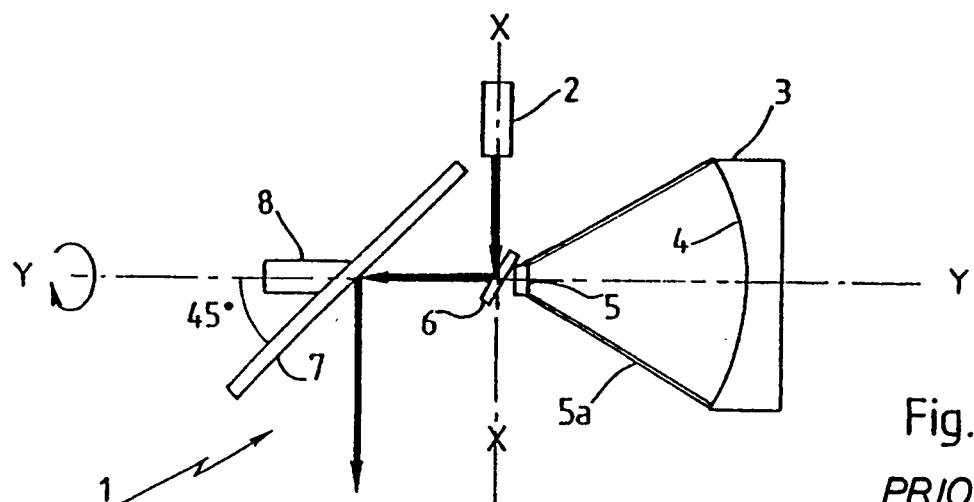
FIG. 1 is an explanatory view of a conventional scanning emitter-receiver optical instrument, during emission of a laser pulse.
Figure 2:
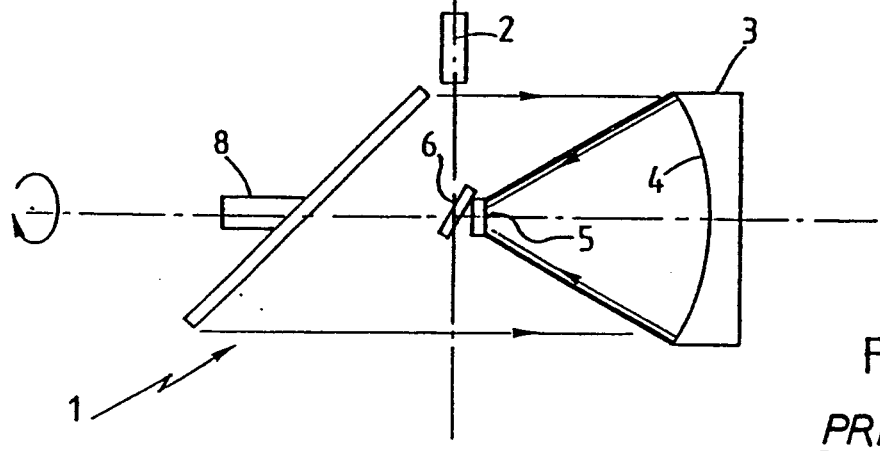
FIG. 2 is an explanatory view of the optical instrument, during reception of a return beam.
Figure 3:
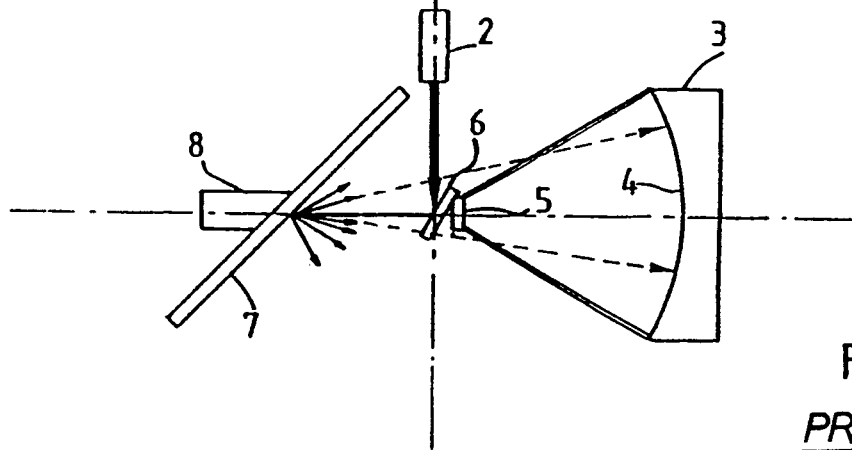
FIG. 3 is an explanatory view of the optical instrument, during reflection of a laser pulse that has just been emitted towards the central section of the scanning mirror.
Figure 5:
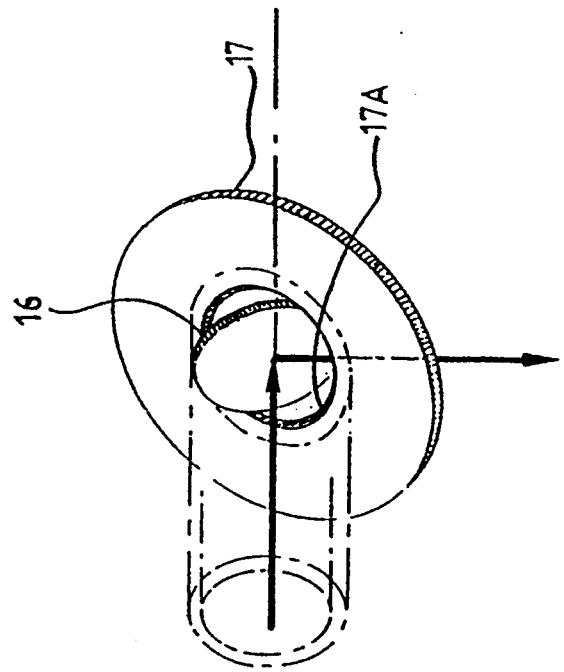
FIG. 5 is a perspective view of the scanning mirror of the instrument shown in FIG. 4.
Figure 4:
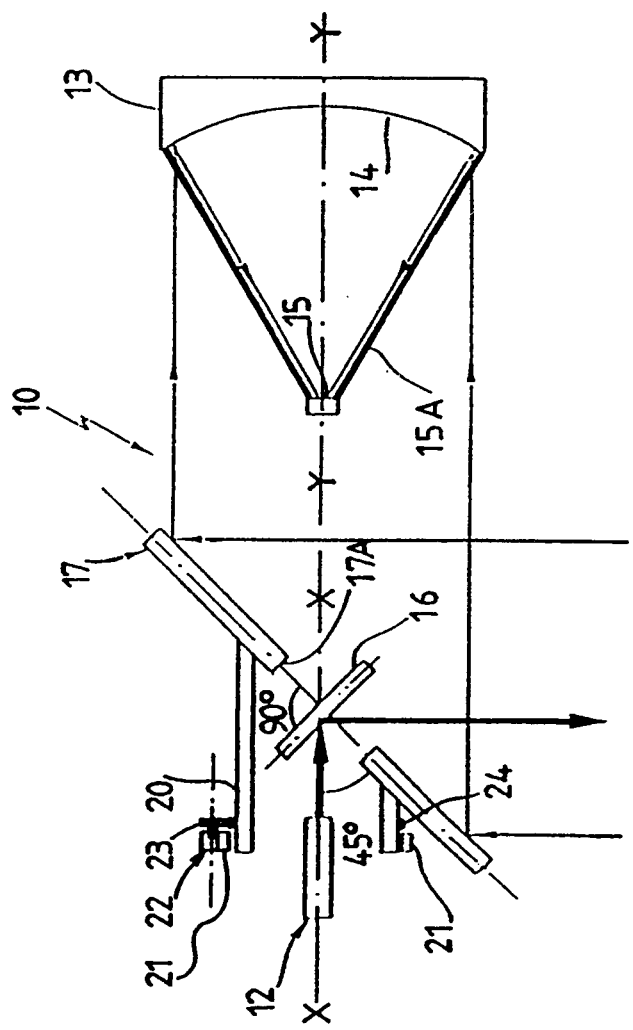
FIG. 4 is an explanatory view of a scanning emitter-receiver optical instrument in accordance with the invention.

An optical instrument according to the invention, which is generally shown by reference numeral 10 in FIG. 4 embodies, as in the case of the conventional optical instrument 1 of FIGS. 1 to 3, an optical source 12 adapted to emit a primary beam along an emission axis X—X, a deflecting mirror 16 arranged on the emission axis so as to intercept and deflect the primary beam as a deflected beam, a telescope 13, having an optical axis Y—Y, which has a reflecting surface 14 and a detector 15 kept in a fixed position relative to the reflecting surface on the optical axis by means of a supporting structure schematically represented by 15A, and a scanning mirror 17 mounted so as to rotate around a rotation axis (or scan axis) coaxial with the optical axis of the telescope with an inclination of 45° with respect to the optical axis.

The optical instrument 10 has the particularity that the optical source 12 is arranged behind the scanning mirror, in other words opposite to the telescope and its detector, with respect to the scanning mirror, its emission axis being coaxial with the rotation axis of the scanning mirror. Furthermore the scanning mirror is apertured at its center so as to provide a central opening or aperture 17A. The deflecting mirror is arranged in this opening in a fixed position with respect to the scanning mirror (thus movable with respect to the optical source 12 and to the telescope 13) at an inclination of 90° with respect to the latter.

It should be noted that when the scanning mirror rotates about its axis, in a continuous or oscillatory manner, the deflecting mirror rotates in the same manner while deflecting the beam emitted by the laser source directly away from the instrument.

In a variation of this arrangement, not represented here, the laser source embodies a source, the emission axis of which is tilted with respect to the rotation axis, combined with a second deflecting mirror adapted to deviate the emitted beam in direction of the rotation axis.

Since the optical source 12 is positioned opposite to the telescope with respect to the scanning mirror and the deflecting mirror forms a screen between the source and the telescope, stray light problems due to reflection of the laser beam away from the instrument are substantially eliminated.

In order to form an effective screen between the source and the telescope, the deflection mirror preferably has a sectional dimension, in a projection normal to the optical axis X—X/Y—Y, at least as large as the sectional dimension of the aperture 17A. This is however not required if the laser beam emitted by the source is sufficiently well collimated.

It may be appreciated that in accordance with this invention, the scanning mirror 17 loses (to the benefit of the deflection mirror) part of its effective surface when compared with the instrument shown in FIGS. 1 to 3, although this loss is, in fact, quite tolerable since there is in any case an obstruction of the return beam caused by the telescope detector 15 or even by the support structure 15A in the case of a Newton telescope as considered here; different CASSEGRAIN telescopes, as well as centered (on axis) or non centered (off axis) configurations could be contemplated. In fact the effective scanning mirror surface loss incurred by the deflecting mirror can be advantageously chosen to be equivalent or smaller than that due to the telescope focal plane (detector).

The rotational movement of the mirror in FIG. 4 is provided by a hollow tube 20 integral with the mirror and traversed by the emission axis X—X and which cooperates with bearings 21 and a drive motor 22, which includes, for example, a pinion 23 cooperating with a ring gear 24 encircling the tube and forming a rack.

In a variation of this arrangement, not represented here, the movement is ensured by a hollow motor of any known appropriate type (for example a stepping motor sold by SAGEM).

While the above description has been provided as a non-limiting example, it is evident that many variations will be apparent to those skilled in the art without departing from the invention.

What is claimed is:

1. A scanning emitter-receiver optical device comprising:

an optical source for emitting a primary beam along an emission axis;

a deflecting mirror located on said emission axis so as to intercept and deflect said primary beam;

a telescope positioned relative to said optical source so as to have an optical axis which is substantially coaxial with said emission axis, said telescope having a detector disposed on said optical axis; and a scanning mirror disposed intermediate said optical source and said telescope, said scanning mirror being rotatable about a scan axis which is substantially coaxial with said optical axis of said telescope and having a non-zero inclination with respect to said optical axis, said scanning mirror having a central opening formed therein, said deflecting mirror being secured to said scanning mirror within said central opening so as to be oriented approximately perpendicular to said scanning mirror.

2. A scanning emitter-receiver optical device according to claim 1 wherein said scanning mirror and said deflecting mirror are each oriented approximately 45° with respect to said optical axis of said telescope.

3. A scanning emitter-receiver optical device according to claim 1, wherein said optical source is a laser source.

4. A scanning emitter-receiver optical device according to claim 1, wherein said scanning mirror comprises a hollow tube traversed by said emission axis, bearings supporting said hollow tube, and a drive motor in communication with said hollow tube for rotating said scanning mirror about said scan axis.

5. A scanning emitter-receiver optical device according to claim 4, wherein said drive motor comprises a rack secured to said hollow tube and a pinion in mesh with said rack.

6. A scanning emitter-receiver optical device according to claim 1, further comprising a hollow drive member in communication with said scanning mirror and said deflecting mirror for rotating said scanning mirror and said deflecting mirror about said scan axis.

* * * * *

UNITED STATES PATENT AND TRADEMARK OFFICE
CERTIFICATE OF CORRECTION

PATENT NO. : 5,337,189
DATED : August 9, 1994
INVENTOR(S) : Rodolphe Krawczyk, Guy Cerutti-Maori and Luc Boulissiere It is certified that error appears in the above-indentified patent and that said Letters Patent is hereby corrected as shown below:

Column 1, line 21, delete "X X X;" insert ---- X - X; ----.

Column 2, line 18, delete "asses" insert ---- assess ----.

Column 3, line 49, after "in" insert ---- the ----.

Signed and Sealed this

Fifteenth Day of November, 1994

Attest:

BRUCE LEHMAN

Attesting Officer     Commissioner of Patents and Trademarks